(12) United States Patent
Whitehouse et al.

(10) Patent No.: US 8,487,023 B2
(45) Date of Patent: Jul. 16, 2013

(54) NUCLEATING AGENTS FOR POLYHYDROXYALKANOATES

(75) Inventors: Robert S. Whitehouse, Lexington, MA (US); Allen R. Padwa, Worcester, MA (US)

(73) Assignee: Metabolix, Inc., Cambridge, MA (US)

( * ) Notice: Subject to any disclaimer, the term of this patent is extended or adjusted under 35 U.S.C. 154(b) by 59 days.

(21) Appl. No.: 12/988,175

(22) PCT Filed: Apr. 17, 2009

(86) PCT No.: PCT/US2009/041023
§ 371 (c)(1),
(2), (4) Date: Dec. 3, 2010

(87) PCT Pub. No.: WO2009/129499
PCT Pub. Date: Oct. 22, 2009

(65) Prior Publication Data
US 2011/0124779 A1    May 26, 2011

Related U.S. Application Data

(60) Provisional application No. 61/045,864, filed on Apr. 17, 2008.

(51) Int. Cl.
*C08K 5/3492* (2006.01)
*C08K 5/10* (2006.01)
*C08K 3/00* (2006.01)

(52) U.S. Cl.
USPC ............ 524/101; 524/306; 524/308; 524/404

(58) Field of Classification Search
USPC ................................. 524/101, 404, 306, 308
See application file for complete search history.

(56) References Cited

U.S. PATENT DOCUMENTS

| 7,718,720 | B2 | 5/2010 | Padwa |
| 8,003,719 | B2 | 8/2011 | Padwa |
| 2004/0214927 | A1 | 10/2004 | Nitzsche |
| 2005/0101713 | A1 | 5/2005 | Lake, Jr. et al. |
| 2005/0209377 | A1* | 9/2005 | Padwa ............................ 524/99 |
| 2010/0130652 | A1 | 5/2010 | Padwa |

FOREIGN PATENT DOCUMENTS

| EP | 1 520 880 A2 | 4/2005 |
| EP | 1 642 926 A1 | 4/2006 |
| WO | WO 00/53669 A1 | 9/2000 |
| WO | WO 2005/066256 | 7/2005 |
| WO | WO 2008/073401 A1 | 6/2008 |
| WO | WO 2008/079262 A2 | 7/2008 |

OTHER PUBLICATIONS

International Preliminary Report on Patentability and Written Opinion for PCT/US2009/041023, dated Oct. 19, 2010.
International Search Report for Int'l Application No. PCT/US2009/041023. Date mailed: Jun. 24, 2009.
Gu-Su Jang et al., "Crystallization Behavior of Polypropylene with or without Sodium Benzoate as a Nucleating Agent", *Journal of Polymer Science: Part B: Polymer Physics*, vol. 39: 1001-1016 (2001).
Groeninckx, H. et al., "Crystallization of Poly(ethylene Terephthalate) Induced by Inorganic Compounds. I. Crystallization Behavior from the Glassy State in a Low-Temperature Region", *Journal of Polymer Science: Polymer Physics Edition*, vol. 12: 303-316 (1974).

* cited by examiner

*Primary Examiner* — Kriellion Sanders
(74) *Attorney, Agent, or Firm* — Hamilton, Brook, Smith & Reynolds, P.C.

(57) ABSTRACT

Provided herein are nucleating agent compositions for use in nucleating polymers during processing. Methods for making and using the nucleating agent compositions are also provided. The nucleating agent in dry powder form is wet milled in a liquid carrier, such as a plasticizer, surfactant, or lubricant.

31 Claims, 4 Drawing Sheets

NUCLEATING AGENTS FOR POLYHYDROXYALKANOATES

RELATED APPLICATION

This application claims the benefit of U.S. Provisional Application No. 61/045,864, filed on Apr. 17, 2008. The entire teachings of the above application are incorporated herein by reference.

FIELD OF THE INVENTION

The present disclosure relates to nucleating agents for polymers.

BACKGROUND

The nucleation of semicrystalline polymers with dry particulate materials is well documented. For instance, Jang et al. (*J. Polymer Sci.* B39:1001 (2001)) used a 4 micron particle size sodium benzoate as a nucleating agent for polypropylene. Ciba Geigy in their commercial literature identify Irgastab NA02 (sodium benzoate with a maximum particle size of 20 microns and mean size of less than 3 microns) and Irgastab NA11UH (a phosphate ester with particle size 6-8 microns). Groeninckx et al. (*J. Poly. Sci., Poly. Phys. Ed.* 12:303 (1974)) identified that the optimum size for nucleating polyethylene terephthalate (PET) with inorganic particles was 1-3 microns and a volume fraction of 0.2%.

SUMMARY OF THE INVENTION

The invention pertains to methods for preparing a nucleating composition, comprising: dispersing a nucleating agent in dry powder form in a liquid carrier to form a nucleant-liquid mixture; and wet milling the nucleant-liquid mixture until at least 5% of the cumulative solid volume of the nucleating agent exists as particles with a particle size of 5 microns or less to form a nucleating composition.

Methods are also provided for preparing a nucleating pellet, comprising: dispersing a nucleating agent in dry powder form in a liquid carrier to form a nucleant-liquid mixture; wet milling the nucleant-liquid mixture until at least 5% of the cumulative solid volume of the nucleating agent exists as particles with a particle size of 5 microns or less to form a milled nucleant suspension; dispersing the milled nucleant suspension in a carrier polymer under conditions that cause melting of the carrier polymer, to form a nucleant-carrier polymer composition; and cooling and shaping the nucleant-carrier polymer composition to form a nucleating pellet.

The invention also relates to methods of preparing a polymer blend, comprising dispersing a nucleating pellet in a base polymer under conditions that cause melting of the base polymer and nucleating pellet to form a polymer blend; wherein the nucleating pellet comprises a nucleating agent dispersed in a carrier polymer, wherein at least 5% of the cumulative solid volume of the nucleating agent exists as particles with a particle size of 5 microns or less.

Also described are methods of preparing a polymer blend, comprising dispersing a nucleating composition in a base polymer under conditions to form a polymer blend; wherein the nucleating composition comprises a nucleating agent in dry powder form dispersed in a liquid carrier, wherein at least 5% of the cumulative solid volume of the nucleating agent exists as particles with a particle size of 5 microns or less.

Compositions are also provided herein, including in one aspect a composition comprising a nucleating agent and a polymer, wherein the nucleating agent is dispersed in the polymer and wherein at least 5% of the cumulative solid volume of the nucleating agent exists as particles with a particle size of 5 microns or less.

In another aspect, a nucleating pellet is provided comprising, a nucleating agent, a liquid carrier and a carrier polymer, wherein the nucleating agent is dispersed in the liquid carrier and the carrier polymer, wherein at least 5% of the cumulative solid volume of the nucleating agent exists as particles with a particle size of 5 microns or less.

The invention also relates to a nucleating composition, comprising a nucleating agent, and a liquid carrier. The nucleating agent is dispersed in the liquid carrier and at least 5% of the cumulative solid volume of the nucleating agent exists as particles with a particle size of 5 microns or less.

In certain embodiments, the nucleating agent can be selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, the liquid carrier can be a plasticizer, e.g., a citric compound or an adipic compound, e.g., CITROFLEX A4® citric acid ester plasticizer, or DBEEA (dibutoxyethoxyethyl adipate), a surfactant, e.g., TRITON™ X-100 non-ionic surfactant, TWEEN®20 polysorbate surfactant, TWEEN®65 ethoxylated sorbitan ester surfactant, SPAN™40 sorbitan monopalmitate or SPAN™86 non-ionic surfactant, a lubricant, a volatile liquid, e.g., chloroform, heptane, or pentane, a organic liquid or water.

In particular embodiments, the nucleating agent is provided in a liquid carrier. The resultant composition is referred to as the nucleant-liquid mixture. In these embodiments, the nucleating agent can be selected from: cyanuric acid, carbon black, mica talc, silica, boron nitride, clay, calcium carbonate, synthesized silicic acid and salts, metal salts of organophosphates, and kaolin and the liquid carrier can be a plasticizer, e.g., a citric compound or an adipic compound, e.g., CITROFLEX A4® citric acid ester plasticizer, or DBEEA (dibutoxyethoxyethyl adipate), a surfactant, e.g., TRITON™ X-100 non-ionic surfactant, TWEEN®20 polysorbate surfactant, TWEEN®65 ethoxylated sorbitan ester surfactant, SPAN™40 sorbitan monopalmitate or SPAN™86 non-ionic surfactant, a lubricant, a volatile liquid, e.g., chloroform, heptane, or pentane, a organic liquid or water. In particular embodiments, the nucleating agent is cyanuric acid and the liquid carrier is. The amount of nucleating agent in the liquid carrier is from 5% to 50% by weight, from 20% to 45% by weight, from 30% to 40% by weight, or 40% by weight of the nucleating agent and liquid carrier combined weight.

In certain embodiments of the invention, at least 5% of the cumulative solid volume, at least 10% of the cumulative solid volume, at least 20% of the cumulative solid volume, at least 30% or at least 40%-50% of the nucleating agent can exist as exists as particles with a particle size of 5 microns or less, 2 microns or less or 1 micron or less.

The cumulative solid volume of particles is the combined volume of the particles in dry form in the absence of any other substance. The cumulative solid volume of the particles can be determined by determining the volume of the particles before dispersing them in a polymer or liquid carrier by, for example, pouring them dry into a graduated cylinder or other suitable device for measuring volume.

It should be understood that this invention is not limited to the embodiments disclosed in this Summary, and it is intended to cover modifications that are within the spirit and scope of the invention, as defined by the claims.

BRIEF DESCRIPTION OF THE DRAWINGS

FIG. 2 is a plot of the particle size in microns (x-axis) of cyanuric acid that is either air jet milled (♦) or air jet milled and then wet milled (■), as measured by light-scattering, versus the cumulative volume percent (y-axis) of those measured particle sizes.

DETAILED DESCRIPTION

Figure 1:
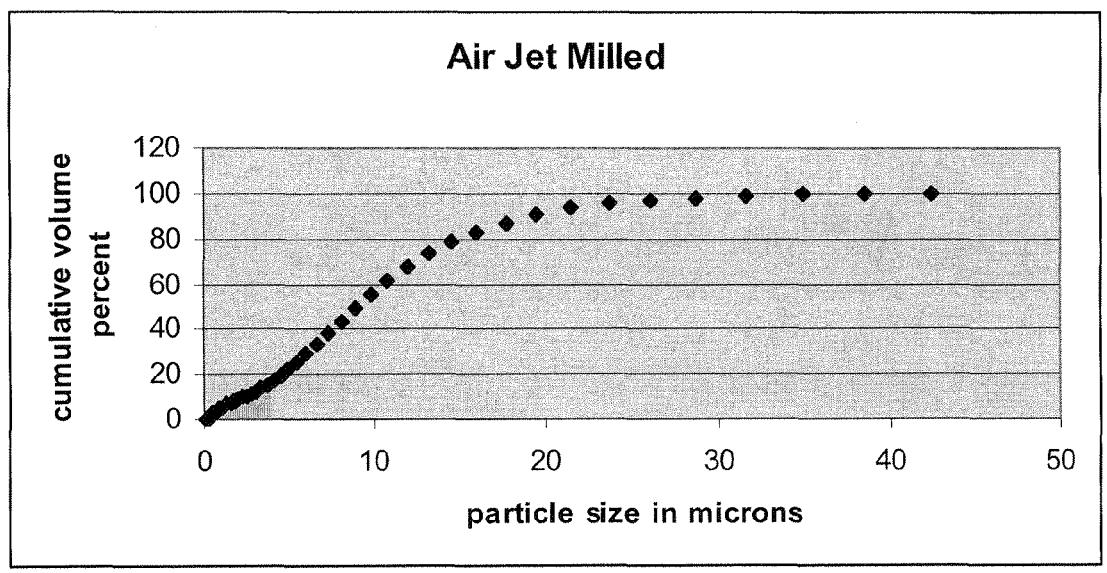
FIG. 1 is a plot of the particle size in microns (x-axis) of air jet milled cyanuric acid as measured by light-scattering, versus the cumulative volume percent (y-axis) of those measured particle sizes.

The present invention includes compositions of a nucleating agent, methods of preparing the nucleating agents and methods of preparing polymer blends using the nucleating agent compositions.

The polymer blends and compositions can be processed for making products using known methods for processing polymer compositions, including injection molding, compression molding, thermoforming, extrusion, casting, blowing, etc. In making useful products from polymers, typically a three step process is used comprising melting, shaping and cooling. Variations on these steps are also used for generating desired products. Melting of the polymer or resins occurs at the temperature at which the polymer resin changes from a solid to liquid. For example, a polymer blend can be mixed and melted in an extruder and then molded and cooled to make a desired product.

Dispersing means mixing a nucleating agent throughout a composition, e.g., in a base polymer forming a polymer blend or in a liquid carrier forming a nucleant-liquid mixture for separation of the particles. In certain embodiments the nucleating agent is dispersed in a liquid carrier and polymer carrier. In particular embodiments, the nucleating agent is homogeneously dispersed in the resultant composition.

Wet-milling means milling or grinding a composition in a liquid (e.g., liquid carrier) until a desired particle size is achieved, relative to micronized or air jet milled versions of the composition. For purposes of the present invention, grinding is commonly continued until the particle size is reduced. In air jet milling, compressed air is forced through a nozzle to be accelerated to supersonic speeds. At these speeds, it enters the crushing chamber, and fluidizes the powder that has been placed within it. An air jet milling machine usually has several nozzles pointed into the chamber from different angles. The fluidized powder converges at the meeting point of the nozzles, and is subjected to violent collision, shearing and grinding. Fine particles are transported by updraft to a sorting area where they are classified by centrifugal force, while coarser materials remain in the grinding chamber. For example, this process can be used for reducing a nucleating agent from 50-250 microns in size down to less than 5 microns.

In certain aspects of the invention, after wet-milling at least 5% of the cumulative solid volume of the nucleating agents exists as particles with a particle size of 5 microns or less, in other embodiments, at least 10% of the cumulative solid volume of the nucleating agent exists as particles with a particle size of 5 microns or less. In other aspects, at least 20% of the cumulative solid volume of the nucleating agent exists as particles with a particle size of 5 microns. In still other aspects, at least 30% of the cumulative solid volume of the nucleating agent exists as particles with a particle size of 5 microns. In yet other aspects, at least 40% or at least 50% of the cumulative solid volume of the nucleating agent exists as particles with a particle size of 5 microns. In the forgoing aspects, the nucleating agent has a particle size of 2 microns or less or 1 micron or less.

Nucleating agents dispersed as fine particles, with reduced agglomeration of the particles into larger particle sizes, or degradation of the polymer during the compounding step are obtained by the methods described herein.

A nucleating agent is an agent that provides sites for crystal formation in polymer melts. A nucleating composition is a composition which comprises a nucleating agent.

The nucleating agent of the methods and compositions herein is selected from cyanuric acid or related compounds, carbon black, mica talc, silica, boron nitride, clay, calcium carbonate, synthesized silicic acid and salts, metal salts of organophosphates, kaolin, and possibly other materials. Nucleating agents for various polymers can include simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorus acid and its metal salts, such as diphenyl phosphate, diphenyl phosphite, metal salts of bis(4-tert-butylphenyl)phosphate, and methylene bis-(2,4-tert-butylphenyl)phosphate; sorbitol derivatives such as bis(p-methylbenzylidene)sorbitol and bis (p-ethylbenzylidene)sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

The amount of nucleating agent in liquid carrier is from 5% to 50% by weight of the nucleating agent-liquid carrier composition, preferably from 20% to 45% by weight, more preferably 30% to 40% by weight, and most preferably 40% by weight of the combined weight of the nucleating agent and liquid carrier.

A liquid carrier is typically used in combination with the nucleating agent. The liquid carrier allows the nucleating agent to be wet milled.

Once the nucleating agent has been wet milled in the liquid carrier, and an appropriate amount of the liquid carrier plus nucleating agent is then added to the polymer to be processed. One of ordinary skill in the art of polymer compounding can therefore plan the nucleant and liquid carrier ratio to suit their specific needs, knowing by experience what amount of nucleant and liquid carrier (i.e., plasticizer, surfactant, lubricant, etc.) are appropriate to use.

Choice of the liquid carrier is important as the carrier becomes an integral component in the polymer formulation when the nucleant is added. In poly-3-hydroxybutyrate compositions, for example, plasticizers are often used to change the glass transition temperature and modulus of the composition, but surfactants may also be used. Lubricants may also be used, e.g., in injection molding applications. Plasticizers, surfactants and lubricants may all therefore be used as the liquid carrier for the milling of the nucleating agent.

The liquid carrier for wet milling the nucleant can be a plasticizer. Examples of plasticizers include but are not limited to phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to, polypropylene adipate and polypropylene sebacate), epoxidized soy bean oil, epoxidized butyl stearate, epoxidized octyl stearate, chlorinated paraffins, chlorinated fatty acid esters, fatty acid compounds, plant oils, pigments, and acrylic compounds.

The plasticizers may be used either alone respectively or in combinations with each other.

In certain embodiments, the liquid carrier for wet milling the nucleating agent can be a surfactant. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Surfactants can also include detergents such as TRITON™ X-100 non-ionic surfactant, TWEEN®20 polysorbate surfactant, TWEEN®65 ethoxylated sorbitan ester surfactant, SPAN™40 sorbitan monopalmitate and SPAN™86 non-ionic surfactant.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

In other embodiments, the liquid carrier is a lubricant. For example, a lubricant normally used in polymer processing can also be used as the liquid carrier for wet milling the nucleant. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants can be warmed and melted during the wet milling.

In yet other embodiments, the liquid carrier is a volatile or organic solvent. In these embodiments, a volatile solvent will flash off during subsequent compounding of the polymer, leaving behind the nucleating agent. Volatile liquid carriers that can be used in the invention include, alcohols (e.g., ethanol, propanol, isopropanol, etc.

Examples of organic solvents for use in the methods and compositions of the invention include but are not limited to: n-pentane, n-hexane, isohexane, n-heptane, n-octane, isooctane, n-decane, 2,2-dimethylbutane, petroleum ether, petroleum benzine, ligroin, gasoline, kerosene, petroleum spirit, petroleum naphtha, 2-pentene, mixed pentene, cyclohexane, methylcyclohexane, benzene, toluene, xylene, ethylbenzene, diethylbenzene, isopropylbenzene, amylbenzene, diamylbenzene, triamylbenzene, tetraamylbenzene, dodecylbenzene, didodecylbenzene, amyltoluene, coal tar naphtha, solvent naphtha, p-cymene, naphthalene, tetralin, decalin, biphenyl, dipentene, turpentine oil, pinene, p-menthane, pine oil, camphor oil, methyl chloride, methylene chloride, chloroform, carbon tetrachloride, ethyl chloride, ethylene chloride, ethylidene chloride, 1,1,1-trichloroethane, 1,1,2-trichloroethane, 1,1,1,2-tetrachloroethane, 1,1,2,2-tetrachloroethane, pentachloroethane, hexachloroethane, vinylidene chloride, 1,2-dichloropropane, butyl chloride, amyl chloride, mixed amyl chloride, dichloropentane, hexyl chloride, 2-ethylhexyl chloride, methyl bromide, ethyl bromide, ethylene bromide, tetrabromoethane, chlorobromomethane, ethylene chlorobromide, chlorobenzene, o-dichlorobenzene, 1,2,4-trichlorobenzene, bromobenzene, o-dibromobenzene, o-chlorotoluene, p-chlorotoluene, alpha-chloronaphthalene, chlorinated naphthalene, fluorodichloromethane, dichlorodifluoromethane, fluorotrichloromethane, trifluoromonobromomethane, difluorochloroethane, 1,1,2-trichloro-1,2,2-trifluoroethane, ethyl ether, dichloroethyl ether, isopropyl ether, n-butyl ether, diisoamyl ether, n-hexyl ether, methyl phenyl ether, ethyl phenyl ether, n-butyl phenyl ether, amyl phenyl ether, o, m, p-cresyl methyl ether, p-t-amylphenyl n-amyl ether, ethyl benzyl ether, 1,4-dioxane, trioxane, furan, furfural, dioxolane, 2-methylfuran, tetrahydrofuran, cineol, methylal, diethyl acetal, acetone, methylacetone, methyl ethyl ketone, methyl n-propyl ketone, methyl n-butyl ketone, methyl isobutyl ketone, methyl n-amyl ketone, methyl n-hexyl ketone, diethyl ketone, ethyl n-butyl ketone, di-n-propyl ketone, diisobutyl ketone, 2,6,8-trimethylnonanone-4, acetone oil, acetonylacetone, mesityl oxide, phorone, isophorone, cyclohexanone, methylcyclohexanone, acetophenone, dypnone, camphor, methyl formate, ethyl formate, propyl formate, n-butyl formate, isobutyl formate, methyl acetate, ethyl acetate, n-propyl acetate, isopropyl acetate, n-butyl acetate, isobutyl acetate, sec-butyl acetate, n-amyl acetate, isoamyl acetate, methylisoamyl acetate, methoxybutyl acetate, sec-hexyl acetate, 2-ethylbutyl acetate, methylisobutylcarbinol acetate, 2-ethylhexyl acetate, cyclohexyl acetate, methylcyclohexyl acetate, benzyl acetate, methyl propionate, ethyl propionate, n-butyl propionate, isoamyl propionate, methyl butyrate, ethyl butyrate, n-butyl butyrate, isoamyl butyrate, ethyl oxyisobutyrate, butyl stearate, amyl stearate, methyl acetoacetate, ethyl acetoacetate, isoamyl isovalerate, methyl lactate, ethyl lactate, butyl lactate, amyl lactate, methyl benzoate, ethyl benzoate, propyl benzoate, butyl benzoate, isoamyl benzoate, benzyl benzoate, ethyl cinnamate, methyl salicylate, octyl adipate, diethyl oxalate, dibutyl oxalate, diamyl oxalate, diethyl malonate, dibutyl tartrate, tributyl citrate, dioctyl sebacate, dimethyl phthalate, diethyl phthalate, dibutyl phthalate, di-2-ethylhexyl phthalate, dioctyl phthalate, nitromethane, nitroethane, nitropropane, nitrobenzene, nitroanisole, monomethylamine, dimethylamine, trimethylamine, monoethylamine, diethylamine, triethylamine, aniline, toluidine, acetoamide, acetonitrile, benzonitrile, pyridine, picoline, lutidine, quinoline, morpholine, carbon disulfide, dimethyl sulfoxide, propanesulfone, triethyl phosphate, polyethylene glycol, polypropylene glycol, polytetramethylene glycol, and polyepichlorohydrin. These organic solvents may be used either alone respectively or in combinations with each other.

An advantage of using a volatile liquid is that the liquid will flash off during processing in the extruder, and can be removed. This can be advantageous for applications where little plasticizer or surfactant is desired in the finished polymer product.

In still another embodiments, the liquid carrier for wet milling the nucleating agent is water. An advantage of using water is that it, like the volatile solvents, will also flash off during processing. Additionally, no residue behind is left behind, and minimal or no effect on the chemistry of the polymer itself is found.

In yet other embodiments, the liquid carrier for wet milling the nucleating agent can be a mixture of any of the above. For instance, the liquid carrier can be a mixture of one or more plasticizers, one or more surfactants, one or more volatile liquid carriers, or water. The liquid carrier can also be a mixture of one or more plasticizers, surfactants, volatile liquid carriers, or water.

One of ordinary skill in the polymer processing arts can therefore compose the overall liquid carrier with consideration for the later processing of the polymer. For instance, if the polymer application calls for only a small amount of plasticizer or surfactant, then one can compose a liquid carrier with a small amount of plasticizer or surfactant, with the balance of the carrier being a volatile liquid that will flash off during processing.

In certain embodiments, the methods and compositions of the invention further include a polymer. In certain embodiments, the polymer is a carrier polymer. A carrier polymer is a polymer included in compositions for dispersing a nucleating agent. In certain aspects, the carrier polymer is combined with the nucleating agent and a liquid carrier under conditions to form a nucleating pellet. A nucleating pellet is a composition distributed within a base polymer to facilitate crystallization. A base polymer or polymer as used in the methods and compositions of the invention is a polymer used in compositions for making a useful product or article.

In certain embodiments, a base polymer and a carrier polymer is the same polymer. In other embodiments, the base polymer and the carrier polymer are different.

The polymers (e.g., base and/or carrier polymers) as described herein can be a polyhydroxyalkanoate (hereinafter referred to as (PHAs). Polyhydroxyalkanoates are biological polyesters synthesized by a broad range of natural and genetically engineered bacteria as well as genetically engineered plant crops (Braunegg et al., (1998), *J. Biotechnology* 65: 127-161; Madison and Huisman, 1999, *Microbiology and Molecular Biology Reviews*, 63: 21-53; Poirier, 2002, Progress in Lipid Research 41: 131-155). These polymers are biodegradable thermoplastic materials, produced from renewable resources, with the potential for use in a broad range of industrial applications (Williams & Peoples, *CHEMTECH* 26:38-44 (1996)). Useful microbial strains for producing PHAs, include *Alcaligenes eutrophus* (renamed as *Ralstonia eutropha*), *Alcaligenes latus, Azotobacter, Aeromonas, Comamonas, Pseudomonas*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, FEMS Microbiol. Lett. 128; 219-228. Examples of monomer units incorporated in PHAs include 2-hydroxybutyrate, lactic acid, glycolic acid, 3-hydroxybutyrate (hereinafter referred to as HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA can be a homopolymer (all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the PHA can be a copolymer (contain two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as PHB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV). By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (all monomer units are identical) PHB and 3-hydroxybutyrate copolymers (PHB3HP, PHB4HB, PHB3HV, PHB4HV, PHB5HV, PHB3HH P, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature $T_M$ of between 80° C. to 180° C. Type 2 PHB copolymers typically have a Tg of −20° C. to −50° C. and Tm of 55° C. to 90° C.

Preferred Type 1 PHB copolymers have two monomer units with have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV;

PHB3HP is a Type 1 PHB copolymer where the 3-HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH;

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 75%, 70%, 65%, 60%, 55%, 50%, 45%, 40%, 30%, 10% by weight of the copolymer.

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer.

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 50% 3HH; 60% 3HH; 70% 3HH; 80% 3HH by weight of the copolymer PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 50% 3HX; 60% 3HX; 70% 3HX; 80% 3HX; 90% 3HX by weight of the copolymer.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer can be a blend of PHB with PHBP where the PHB content in the PHA blend is in the range of 5% to 90% by weight of the PHA in the PHA blend and the 3HP content in the PHBP is in the range of 7% to 15% by weight of the PHBP.

The PHA blend of PHB with a Type 1 PHB copolymer can be a blend of PHB with PHB3HV where the PHB content of the PHA blend is in the range of 5% to 90% by weight of the PHA in the PHA blend and the 3HV content in the PHB3HV is in the range of 4% to 22% by weight of the PHBV.

The PHA blend of PHB with a Type 1 PHB copolymer can be a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer can be a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer can be a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer can be a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer can be a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend can be a blend of a Type 1 PHB copolymer selected from the group PHBP, PHB4HB, PHBV, PHV4HV, PHB5HV, PHB3HH and PHB3HX with a second Type 1 PHB copolymer which is different from the first Type 1 PHB copolymer and is selected from the group PHBP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer can be a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer can be a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer can be a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer can be a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend can be a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend can be a blend as disclosed in U.S. Pub. App. No. 2004/0220355, by Whitehouse, published Nov. 4, 2004, which is incorporated herein by reference in its entirety.

Microbial systems for producing the PHB copolymer PHBV are disclosed in U.S. Pat. No. 4,477,654 to Holmes. PCT WO 02/08428, by Skraly and Sholl describes useful systems for producing the PHB copolymer PHB4HB. Useful processes for producing the PHB copolymer PHB3HH have been described (Lee et. al., 2000, Biotechnology and Bioengineering, 67: 240-244; Park et al., 2001, Biomacromolecules, 2: 248-254). Processes for producing the PHB copolymers PHB3HX have been described by Matsusaki et. al., (*Biomacromolecules*, 2000, 1: 17-22).

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the carrier polymer and/or base polymer or polymer if applicable is each independently PHB or a Type 1 PHB copolymer such as PHBP, PHB4HB, PHB3HV, PHB4HV, PHB5HV, PHB3HH or PHB3HX.

In more particular embodiments, the carrier polymer, and/or base polymer, or polymer if applicable is each independently PHB, PHB3HV where the 3HV content is in the range of 2% to 22% by weight of the polymer, PHB3HP where the 3HP content is in the range of 3% to 15% by weight of the polymer, PHB4HB where the 4HB content is in the range of 3% to 15% by weight of the polymer, PHB4HV where the 4HV content is in the range of 3% to 15% by weight of the polymer, PHB3HH where the 3HH content is in the range of 3% to 15% by weight of the polymer or PHB3HX where the 3HX content is in the range of 3% to 12% by weight of the polymer. The percent range indicated is the percent weight of monomer relative to the total weight of the polymer. For example, in PHB4HB with 3% to 15% 4HB content, 3% to 15% of the total PHB4HB polymer weight is 4-hydroxybutyrate.

In certain embodiments, the carrier polymer, and/or base polymer or polymer if applicable is each independently PHB blended with a Type 1 PHB copolymer selected from the group: PHB3HV where the 3HV content is in the range of 2% to 22% by weight of the polymer, PHB3HP where the 3HP content is in the range of 3% to 15% by weight of the polymer, PHB4HB where the 4HB content is in the range of 3% to 15% by weight of the polymer, PHB4HV where the 4HV content is in the range of 3% to 15% by weight of the polymer, PHB3HH where the 3HH content is in the range of 3% to 15% by weight of the polymer or PHB3HX where the 3HX content is in the range of 3% to 12% by weight of the polymer.

In certain embodiments, the carrier polymer, and/or base polymer or polymer if applicable is each independently PHB blended with a Type 2 PHB copolymer selected from the group: PHB4HB where the 4HB content is in the range of 20% to 60% by weight of the polymer, PHB3HH where the 3HH content is in the range of 35% to 90% by weight of the polymer, PHB5HV where the 5HV content is in the range 20% to 60% by weight of the copolymer or PHB3HX where the 3HX content is in the range of 30% to 90% by weight of the copolymer.

In more particular embodiments, the carrier polymer, and/or base polymer or polymer if applicable is each independently a) PHB blended with b) a PHB4HB with a 5% to 15% 4HB content; a) PHB blended with b) a PHB3HV with a 5% to 22% 3HV content; a) PHB blended with b) a PHB3HH with a 3% to 15% 3HH content; a) PHB blended with b) a PHB3HX with a 3% to 12% 3H content; a) PHB blended with b) a PHB5HV with a 3% to 15% 5HV content; a) a PHB4HB with a 5% to 15% 4HB content blended with b) a PHB3HV) with a 5% to 22% 3HV content; a) a PHB4HB with 5% to 15% 4HB content blended with b) a PHB3HH with a 3% to 15% 3HH content or a) a PHB3HV with a 5% to 22% 3-hydroxyvalerate content blended with b) a polyPHB3HV with a 3% to 15% 3HH content.

In other particular embodiments, the carrier polymer, and/or base polymer or polymer if applicable is each independently a) PHB blended with b) a PHB4HB and the weight of polymer a) is 5% to 95% of the combined weight of polymer a) and polymer b); a) PHB blended with b) a PHB3HV and the weight of polymer a) is 5% to 95% of the combined weight of polymer a) and polymer b); a) PHB blended to with b) PHB3HH and the weight of polymer a) is 5% to 95% of the combined weight of polymer a) and polymer b); a) PHB4HB blended with b) a PHB3HV and the weight of polymer a) is 5% to 95% of the combined weight of polymer a) and polymer b); a) a PHB4HB blended with b) a PHB3HH and the weight of polymer a) is 5% to 95% of the combined weight of polymer a) and polymer b); or a) a PHB3HV blended with b) a PHB3HH and the weight of polymer a) is 5% to 95% of the combined weight of polymer a) and polymer b).

In yet other particular embodiments, the carrier polymer, and/or base polymer or polymer if applicable is each independently a) PHB blended with b) a PHB4HB with a 20-60% 4-HB content; a) PHB blended with b) a PHB5HV with a 20% to 60% 5HH content; a) PHB blended with b) a PHB3HH having a 35%-95% 3-HH content; a) PHB4HB with a 3% to 15% 4HB content blended with b) a PHB4HB with a 20-60% 4HB; a) PHB4HB with a 3% to 15% 4-hydroxybutyrate content blended with b) a PHB5HV with a 20% to 60% 5HV content; a) a PHB4HB with 3% to 15% 4HB content blended with b) a PHB3HX having a 30%-90% 3HX content; a) a PHB3HV with a 3% to 22% 3HV content blended with b) PHB4HB with a 20-60% 4HB content; a) a PHB3HV with a 3% to 22% 3HV content blended with b) PHB5HV with a 20% to 60% 5HV content; a) a PHB3HV with a 3% to 22% 3HV content blended with b) a PHB3HH having a 35%-90% 3-HH content; a) a PHB3HH with a 3% to 15% 3HH content blended with b) a PHB4HB with a 20-60% 4HB content; a) a PHB3HX with a 3% to 12% 3HX content blended with b) a PHB4HB with a 20-60% 4HB content; a) a PHB3HX with a 3% to 12% 3H content blended with b) a PHB5HV with a 20-60% 5HV content; a) a PHB3HH with a 3% to 15% 3HH content blended with b) a PHB5HV with a 20% to 60% 5-HV; a) a PHB3HH with a 3% to 15% 3HH content blended with b) a PHB3HX with a 30% to 90% 3HX content or a) a PHB3HH with a 3% to 15% 3HH content blended with b) a PHB3HH having a 3HH content of 35%-90%.

In more particular embodiments, the carrier polymer, and/or base polymer or polymer if applicable is each independently PHB blended with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend In the embodiments described in the immediately preceding paragraphs describing blends of polymer a and b) or two polymer components, the copolymer blend comprises polymer a) and polymer b), wherein the weight of polymer a) is 20% to 60% of the combined weight of polymer a) and polymer b) and the weight of polymer b is 40% to 80% of the combined weight of polymer a) and polymer b).

In other embodiments, the polymer blends described herein (e.g., blends comprising polymer a) and polymer b) or which otherwise describe two polymer components) comprise a third polymer, polymer c) which is a PHB4HB with a 20% to 60% 4HB content.

In other embodiments the polymer blends described herein (e.g., blends comprising polymer a) and polymer b) or which otherwise describe two polymer components) comprise a third polymer, polymer c) which is a PHB5HV with a 20% to 60% 5HV content.

In other embodiments, the polymer blends described herein (e.g., blends comprising polymer a) and polymer b) or which otherwise describe two polymer components) comprise a third polymer, polymer c) which is a PHB3HH with a 5% to 50% 3HH content.

In other embodiments, the copolymer blend comprises polymer a), polymer b) and polymer c). In particular embodiments, wherein the weight of polymer c) is 5% to 95% of the combined polymer weight of polymer a), polymer b) and polymer c). In yet other embodiments, the weight of polymer c) is 5% to 40% of the combined polymer weight of polymer a), polymer b) and polymer c).

The methods, compositions and pellets described herein are useful for a number of different plastics processing methods and finished articles. Such plastics processing methods can include injection molding, cast and blown film, cast sheet, thermoforming, blow molding, fiber extrusion and fiber spinning, rotomolding foaming extruding the compositions or pellets. The thermoplastic compositions of the present invention can be used to create, without limitation, a wide variety of useful products, e.g., automotive parts, consumer durable parts, construction, electrical, medical, and packaging products. For instance, the compositions and pellets can be used to make, without limitation, films (e.g., packaging films, agricultural film, mulch film, erosion control, hay bale wrap, slit film, food wrap, pallet wrap, protective automobile and appliance wrap, etc.), golf tees, caps and closures, agricultural supports and stakes, paper and board coatings (e.g., for cups, plates, boxes, etc.), thermoformed products (e.g., trays, containers, yoghurt pots, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), foamed products, like clamshells, cups, plates, insulation, packaging pellets, sheet foam.

Problems with air jet milling nucleating agents (e.g., cyanuric acid) include small resulting particle size and its sensitivity to trace amounts of moisture tends to cause the material to agglomerate and such agglomerates are very difficult to redisperse. Energy costs for air jet milling are relatively high, especially when the material is prone to reagglomeration and the reagglomerated material is recycled through the milling loop many times. Furthermore, even after repeated rounds of milling, fine particles can still form agglomerates after packaging.

It was found, however, that when measured by light scattering, much of the air jet milled nucleating agent (before incorporation into the polymer) had a particle size that was much greater than 3 microns (see, e.g., FIG. 1), most likely due to agglomeration of the nucleant particles. This larger "particle size" is less effective at forming nucleating foci in the polymer during crystallization. By "particle size" is meant the particle size as measured by traditional light scattering techniques. FIG. 1 shows that 50% of the cumulative solid volume of the air jet milled dry powdered cyanuric acid had a particle size of 10 microns or greater, when measured by light scattering.

It was then discovered that when the air jet milled nucleating agent (e.g., cyanuric acid) was subsequently wet milled in a liquid carrier (e.g., a plasticizer), the particle size distribution of the cyanuric acid was reduced to even smaller particles than was seen for the dry milled (air jet milled) nucleating agent, and that the level of agglomeration was also reduced or nonexistent. In practice, a liquid dispersion of nucleating agent (cyanuric acid is also easier to incorporate into the polymer resin, producing a more effective nucleation process. The increased efficiency of the nucleation process was evidenced by the increased crystallization temperature (Tc) seen during controlled cooling of the molten polymer from 200° C.

Wet grinding can be done, for instance, in a model KD5 Dyno Mill, which is a horizontal mill with a 1.5 liter mixing volume capacity. Any equivalent mill can be used. The KD5 Dyno Mill can be used in either a batch cycle or continuous loop mode. The mixing horizontal chamber contains a central horizontal shaft onto which are attached 5-7 polyurethane paddles stators which provided the circumventional driving velocity to agitate the grinding media (typically from, e.g., 0.4 mm to 1.2 mm ceramic beads, with narrow size distribution range). As described herein, the mixing chamber can be filled with 0.6-0.8 mm zirconia beads to about 80-85% volume fill capacity. The shaft speed can be set to, e.g., 2400 rpm. The liquid media (carrier) can be pumped through the chamber while the beads are agitated. This effects a grinding action. The residence time is controlled by the external flow rate of the liquid media. Grinding efficiency is controlled by the size of the beads, shaft rpm and residence time of the material in the chamber (i.e., as a function of flow rate). The liquid exits the mill through a angular slot die which is small enough to retain the grinding media (the beads) while allowing the liquid to flow through the gap, typically, e.g., <50%-25% of the grinding media diameter.

Commercially available cyanuric acid generally has a major particle size distribution in the 125 micron to 250 micron range. In the Examples provided, cyanuric acid was air jet milled to provide fine particles below 5 microns. However, when the particle size was then measured using traditional light scattering techniques, it was found that the particle size was actually much larger than 5 microns. This is due to the well known phenomenon of agglomeration, where fine particles are attracted to each other due to van der Waals forces. It was found that even the use of high sonification forces could not provide a high proportion of the particle sizes in the size area where they are efficient as nucleating agents. It was found that, although the cyanuric acid was air jet milled to a particle size of less than 5 microns, about 80% of the particles measured had a particle size of over 5 microns, i.e., the particles had formed agglomerates. Over 50% of the volume was made up of particles of over 10 microns in size. For ultrafine particles, about 5% of the volume was found to be made up of particles less than 1 micron in diameter, and about 8.5% of the volume was made up of particles of less than 2 microns in diameter.

As shown in the Examples below, wet milling the nucleating agent in a liquid carrier produces a nucleating agent with a particle size well below that obtained via standard air jet milling.

Figure 2:
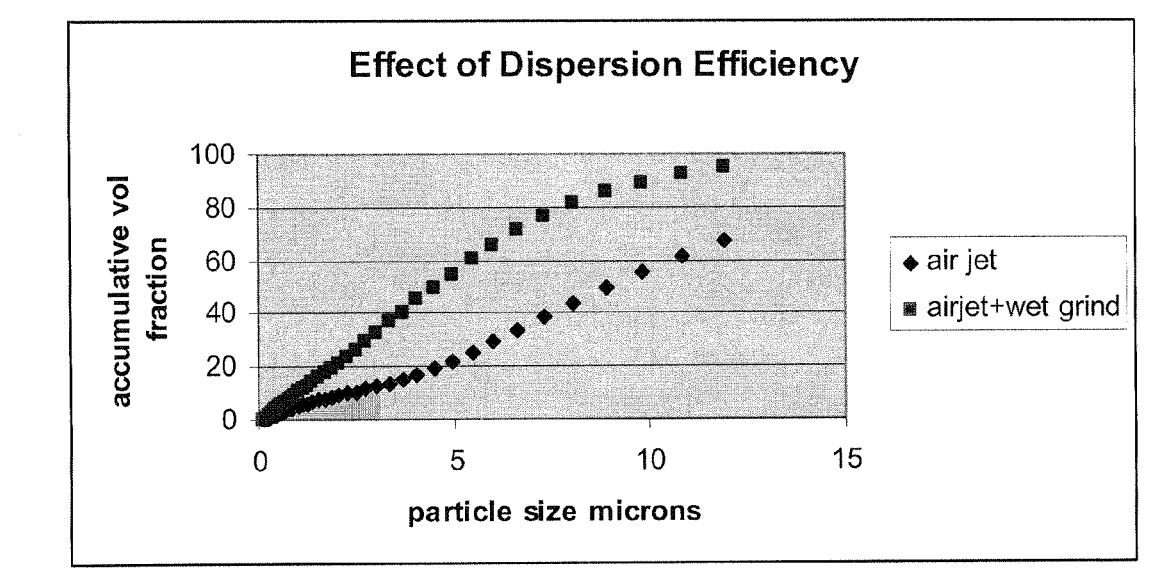

As shown in FIG. 2, the volume fraction below 1 micron increases from around 5 v/v % for air jet milled cyanuric acid to 10.5 v/v % for the same nucleating agent wet milled in CITROFLEX A4® citric acid ester plasticizer (Vertellus, Inc., Indianapolis, Ind., USA). The fraction below 2 microns increased from 8.9 v/v % for the air jet milled to 21.9 v/v % for the wet milled. This is a substantial increase which was found to improve the crystallization behavior of compounded formulations. This is shown in Examples 2 and 3.

Because wet milled nucleating agent contains a much larger proportion of effective small particles than dry milled nucleating agent, one can either use less of it to achieve the same effect as the dry milled, or one can use a similar amount, and achieve a faster rate of crystallization.

EXAMPLES

In certain examples, nucleating agent was prewetted into the liquid carrier (in most cases CITROFLEX A4® citric acid ester plasticizer) to form a slurry. Because of the size and density of the nucleating agent particles (typically 100-250 microns) this slurry will rapidly sediment if not continuously agitated. The slurry was pumped through the media mill (bead size 0.6-0.8 mm, rotor speed 2400 rpm) at rates varying from 100 g/minute to 1200 g/minute, usually in a batch cycle mode. The ground material was submitted to a number of passes through the media mill ranging from 2 to 8 passes, each pass resulting in a size reduction of the nucleating agent.

As a control, cyanuric acid was air jet milled (i.e., micronized) to 3 microns particle size. This material was then compounded in a twin-screw extruder into a masterbatch in PHA resin blend at a rate of 33% cyanuric acid by weight. This masterbatch was used in another PHA resin blend to provide around 1% (by weight) cyanuric acid, uniformly distributed.

Particle size distribution of the nucleating agent was carried out by taking the paste of the ground nucleating agent, diluting it to about 0.1% concentration in isopropanol containing sodium dodecyl sulphonate dispersant, and ultrasonically treating it to break down agglomerates. Particle size distribution was measured using a Malvern light scattering detector. Results are generated in the form of a cumulative volume fraction for "spherical particles" as a function of spherical particle diameter.

These results are shown in the Examples below.

Example 1

Particle Size of Air Jet Milled Nucleating Agent

The cyanuric acid used was obtained as a dry powder with a stated particle size of 150 to 250 microns in size. It was then air jet milled (i.e., micronized) to provide fine particles below 5 microns.

In air jet milling, compressed air is forced through a nozzle to be accelerated to supersonic speeds. At these speeds, it enters the crushing chamber, and fluidizes the powder that has been placed within it. An air jet milling machine usually has several nozzles pointed into the chamber from different angles. The fluidized powder converges at the meeting point of the nozzles, and is subjected to violent collision, shearing and grinding. Fine particles are transported by updraft to a sorting area where they are classified by centrifugal force, while coarser materials remain in the grinding chamber. This process was used to reduce cyanuric acid from 50-250 microns in size down to less than 5 microns.

However, when the particle size was then measured using traditional light scattering techniques, it was found that the particle size was actually much larger than 5 microns. This is shown in FIG. 1, which is a plot of the particle size in microns (x-axis) as measured by light-scattering versus the cumulative volume percent (y-axis) of those measured particle sizes. The small particle size after milling, combined with the sensitivity of the particles to trace amounts of moisture tends to cause the material to agglomerate, and the agglomerates are very difficult to disperse.

FIG. 1 shows that, although the cyanuric acid was milled to a particle size of less than 5 microns, about 80% of the particles measured had an particle size of over 5 microns, i.e., the particles had formed agglomerates. Over 50% of the volume was made up of particles of over 10 microns in size.

Example 2

Air Jet Milled and Wet Milled Nucleant in Plasticizer

In this example, the 5 micron air jet milled cyanuric acid of Example 1 was dispersed in CITROFLEX A4® citric acid ester plasticizer to provide a 33% w/w dispersion in preparation for wet milling. In the pre-stage mixing step, the powder was incorporated into the CITROFLEX A4® citric acid ester plasticizer using a low shear, low speed stirrer to prewet the cyanuric acid powder. A KD5 Dyno Mill was used to wet grind the cyanuric acid CITROFLEX A4® citric acid ester plasticizer dispersion to a paste. The mill has a volume capacity of around 1.5 L and was packed to around 80-85 v/v % capacity with zirconia beads having a diameter range 0.6 mm to 0.8 mm. Flow rates for the paste varied between 100 g/min and 1200 g/min with a rotor speed of 2400 rpm. The plasticizer-nucleant dispersion was passed through the mill four times.

FIG. 2 shows the particle size distributions for the air jet milled (♦) nucleant of Example 1 and air jet milled+wet milled (■) nucleant. This figure is a plot of the particle size in microns (x-axis) as measured by light-scattering, versus the cumulative volume percent (y-axis) of those measured particle sizes. As shown in FIG. 2, the volume fraction below 1 micron increases from around 5 v/v % to 10.5 v/v %. The fraction below 2 microns increased from 8.9 v/v % to 21.9 v/v %. This is a substantial increase which showed improvements in the crystallization behavior of compounded formulations.

To test the effect of wet vs. air jet milling on crystallization behavior, three nucleating masterbatches were made. For nucleating masterbatch 1, the air jet milled cyanuric acid from Example 1 was added to a polyhydroxyalkanoate resin blend composed of a mixture of poly(3-hydroxybutyrate) and copolymers of poly(3-hydroxybutyrateco-4-hydroxybutyrate) of varying 4HB content to make a 33% by weight masterbatch. Nucleating materbatch 2 was air jet+wet milled nucleant in CITROFLEX A4® citric acid ester plasticizer (33%% by weight) made in this example. For nucleating masterbatch 3, cyanuric acid was not air jet milled, but was wetmilled as for materbatch 2. The three nucleating masterbatches were then added polyhydrozyalkanoate resin blend composed of a mixture of poly(3-hydroxybutyrate) and copolymers of poly(3-hydroxybutyrate-co-4-hydroxybutyrate) of varying 4HB content to produce Formulations 1, 2 and 3 as shown in Table 1. CITROFLEX A4® citric acid ester plasticizer was also added to Formulation 1 so that the same level of CITROFLEX A4® citric acid ester plasticizer was present in the formulations and would not be seen as a modifier to the crystallization behavior.

Three polymer formulations compounded with air jet milled nucleant (Formulation 1) and with nucleant that was air jet milled and wet milled (Formulation 2) and wet milled (Formulation 3). Amounts are parts by weight.

TABLE 1

| | Formulation 1 | Formulation 2 | Formulation 3 |
|---|---|---|---|
| PHA blend | 100 | 100 | 100 |
| Nucleating Masterbatch 1 | 1 | | |
| Nucleating Masterbatch 2 | | 3 | |
| Nucleating Masterbatch 3 | | | 3 |
| CITROFLEX A4 ® citricacid ester plasticizer | 2 | | |

The peak crystallization temperature (Tc) as determined by differential scanning calorimetry (DSC) cooling from 200° C. at 10° C./minute was raised in Formulations 2 and 3 relative to the control (Formulation 1). The improvement was substantial, representing the equivalent of a 2.5-fold reduction in the nucleant added to obtain the same crystallizing efficiency

Example 3

Wet Milled Nucleant in Plasticizer

The intermediate air jet milling operation to reduce the particle size of the cyanuric acid from 95% in the 100-250 micron range can be both time consuming and expensive. This example therefore directly compares the effect on crystallization behavior of air jet milled nucleant with the wet milled nucleant.

Commercially available cyanuric acid was purchased with a particle distribution of: 2.7%>250 microns, 65% 125 microns to 250 microns, and 32.3% less than 125 microns.

Using the same procedure as in Example 2, this non-air jet milled material was wet milled (without any air jet milling). This produced the particle size distribution shown in FIG. 3.

Figure 3:
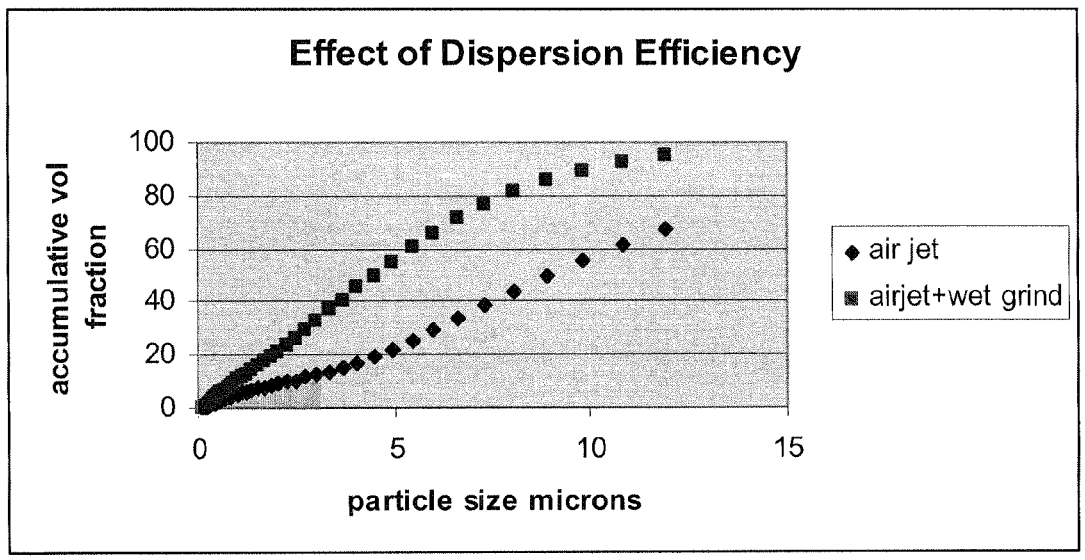
FIG. 3 is a plot of the particle size in microns (x-axis) of cyanuric acid that is either air jet milled (♦) or wet milled alone (■), as measured by light-scattering, versus the cumulative volume percent (y-axis) of those measured particle sizes.

FIG. 3 is a plot of the particle size in microns (x-axis) as measured by light-scattering, versus the cumulative volume percent (y-axis) of those measured particle sizes. This graph shows that the volume fraction of sub-1-micron particles increased from 5% for the air jet milled nucleant (♦) to 8.9% for the wet milled nucleant (■). For sub-2-micron particles, the volume fraction increased from 8.9% for the air jet milled nucleant (♦) to 17% for the wet milled nucleant (■).

These two nucleants were added to base resin as was done in Example 2, and DSC cooling was used to measure the recrystallization temperature (Tc). The wet milled nucleant was found to raise the Tc similarly to that seen in Example 2 for the nucleant that was air jet milled and subsequently wet milled. This demonstrates that air jet milling is unnecessary, and that the entire benefit can be achieved by simply wet milling the nucleant in a liquid carrier.

Example 4

Behavior of Wet Milled DBEEA

The plasticizer DBEEA (dibutoxyethoxyethyl adipate) was evaluated as a liquid carrier. Cyanuric acid was added to DBEEA at a rate of 40% by weight, and the dispersion milled as described above in Example 2, namely, four passes through a KD5 mill.

Figure 4:
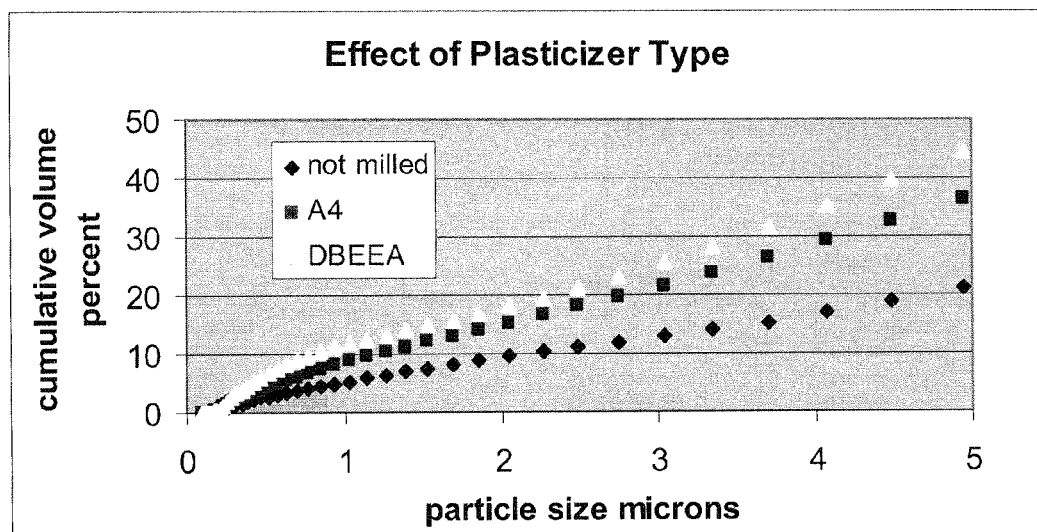
FIG. 4 is a plot of the particle size distributions in microns (x-axis) as measured by light-scattering, versus the cumulative volume percent (y-axis) of those measured particle sizes, for the unmilled (♦) nucleant, and the same nucleant wet milled in CITROFLEX A4® citric acid ester plasticizer (■) and DBEEA (dibutoxyethoxyethyl adipate) (▲).

The particle size was then measured by light scattering, as in Examples 1 and 2, above. The results are shown in FIG. 4, which is a plot of the particle size distributions in microns (x-axis) as measured by light-scattering, versus the cumulative volume percent (y-axis) of those measured particle sizes, for the unmilled (♦) nucleant, and the nucleant wet milled in CITROFLEX A4® citric acid ester plasticizer (■) and DBEEA (▲). The nucleant wet milled in DBEEA had an increased reduction in particle size over the nucleant wet milled in the CITROFLEX A4® citric acid ester plasticizer.

The wet-milled nucleant in DBEEA and in CITROFLEX A4® citric acid ester plasticizer were then compounded into PHA blend base resin as in Examples 2 and 3, above. The PHA blend base resin was composed of a mixture of a mixture of poly(3-hydroxybutyrate) and copolymers of poly(3-hydroxybutyrate-co-4-hydroxybutyrate) of varying 4HB content. These were compared to the Nucleating Masterbatch 1 from Example 2 (air jet milled cyanuric acid compounded into PHA resin).

TABLE 2

Three polymer formulations compounded with nucleant that was air jet milled (Formulation 1), wet milled in CITROFLEX A4 ® citricacid ester plasticizer (Formulation 2) and DBEEA (Formulation 3).

| | Formulation 1 | Formulation 2 | Formulation 3 |
|---|---|---|---|
| Base resin | 100 | 100 | 100 |
| Nucleating Masterbatch 1 (from example 2) | 3.3 | | |
| 33% wet milled cyanuric acid in CITROFLEX A4 ® citricacid ester plasticizer | | 3 | |
| 33% wet milled cyanuric acid in DBEEA | | | 3 |
| CITROFLEX A4 ® citricacid ester plasticizer | 3 | | |
| Acrawax | 0.5 | 0.5 | 0.5 |
| Talc | 22 | 22 | 22 |

The peak crystallization temperatures (Tc) as determined by differential scanning calorimetry (DSC) cooling from 200° C. at 10° C./minute for the polymer formulations nucleated with either wet-milled nucleant were found to be improved over those compounded with the air jet milled nucleant.

Example 5

Boron Nitride Wet Milled in Plasticizer

Boron nitride is another nucleant for polymers. To test the effect of wet milling of boron nitride on the nucleation process, one would wet mill boron nitride in a plasticizer, e.g., CITROFLEX A4® citric acid ester plasticizer, DBEEA, or stearate, e.g., at a rate of 40% by weight, as described above in Examples 2-4. The wet-milled nucleant would then be compounded as described above in Examples 2-4, and the temperature of recrystallization measured by DSC cooling.

Calcium carbonate is another nucleant for polymers. To test the effect of wet milling of calcium carbonate on the nucleation process, one would wet mill calcium carbonate in a surfactant, e.g., TRITON™ X-100 non-ionic surfactant, e.g., at a rate of 40% by weight, as described above in Examples 2 through 4. The wet-milled nucleant would then be compounded as described above, and the temperature of recrystallization measured by DSC cooling.

Example 7

Calcium Carbonate Wet Milled in Lubricant

One can also wet mill calcium carbonate in a lubricant, e.g., stearic acid, e.g., at a rate of 40% by weight, as described above in Examples 2 through 4. The wet-milled nucleant would then be compounded as described above, and the temperature of recrystallization measured by DSC cooling.

Example 8

Boron Nitride Wet Milled in a Volatile Solvent

Boron nitride can also be milled in a volatile solvent, such as chloroform, e.g., at a rate of 40% by weight, as described above in Examples 2-4. The wet-milled nucleant would then be compounded as described above in Examples 2-4, and the temperature of recrystallization measured by DSC cooling.

Example 9

Calcium Carbonate Wet Milled in Water

One can also wet mill calcium carbonate in water, e.g., at a rate of 40% by weight, as described above in Examples 2 through 4. The wet-milled nucleant would then be compounded as described above, and the temperature of recrystallization measured by DSC cooling.

Example 10

Calcium Carbonate and Cyanuric Acid Wet Milled in Plasticizer

One can also wet mill calcium carbonate and cyanuric acid in plasticizer, e.g., CITROFLEX A4® citric acid ester plasticizer, e.g. at a rate of 40% by weight, as described above in Examples 2 through 4. The wet-milled nucleant would then be compounded as described above, and the temperature of recrystallization measured by DSC cooling.

One can also wet mill calcium carbonate and boron nitride in plasticizer, e.g., CITROFLEX A4® citric acid ester plasticizer, e.g. at a rate of 40% by weight, as described above in Examples 2 through 4. The wet-milled nucleant would then be compounded as described above, and the temperature of recrystallization measured by DSC cooling.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While this invention has been particularly shown and described with references to preferred embodiments thereof, it will be understood by those skilled in the art that various changes in form and details may be made therein without departing from the scope of the invention encompassed by the appended claims.

What is claimed is:

1. A nucleating composition comprising
a wet-milled nucleating agent, and
a liquid carrier, wherein the nucleating agent is cyanuric acid or boron nitride and is dispersed and wet-milled in the liquid carrier and wherein at least 50% of the cumulative solid volume of the nucleating agent exists as particles with a particle size of 2 microns or less.

2. The composition of claim 1, wherein the liquid carrier is CITROFLEX A4® citric acid ester or dibutoxyethoxyethyl adipate.

3. The composition of claim 1, wherein the wet-milled nucleating agent exists as particles with a particle size of one micron or less.

4. The composition of claim 1, further comprising a surfactant selected from the group consisting of TRITON X™-100 surfactant, TWEEN®-20 polysorbate surfactant, TWEEN®-65 polysorbate surfactant, SPAN™-40 sorbitan monopalmitate and SPAN™ 80 sorbitan monooleate.

5. The composition of claim 4, wherein the nucleating agent is cyanuric acid, the liquid carrier is CITROFLEX A4® citric acid ester and the surfactant is Span 80 sorbitan monooleate.

6. The composition of claim 1, wherein the amount of nucleating agent in the liquid carrier is from 5% to 50% by weight.

7. A method for preparing a nucleating composition, comprising:
dispersing a nucleating agent in dry powder form in a liquid carrier to form a nucleant-liquid mixture; and
wet milling the nucleant-liquid mixture until at least 50% of the cumulative solid volume of the nucleating agent exists as particles with a particle size of 2 microns or less to form a nucleating composition, wherein the nucleating agent is cyanuric acid or boron nitride.

8. A polymer composition, comprising: a polymer and the composition of claim 1, wherein in the polymer is a) poly(3-hydroxybutyrate) homopolymer blended with a poly(3-hydroxybutyrate-co-4-hydroxybutyrate) with a 20-50% 4-hydroxybutyrate content;
a poly(3-hydroxybutyrate) homopolymer blended with a poly(3-hydroxybutyrate-co-5-hydroxyvalerate) with a 20% to 50% 5-hydroxyvalerate content;
a poly(3-hydroxybutyrate) homopolymer blended with a poly(3-hydroxybutyrate-co-3-hydroxyhexanoate) having a 5%-50% 3-hydroxyhexanoate content;
a poly(3-hydroxybutyrate-co-4-hydroxybutyrate) with 5% to 15% 4-hydroxybutyrate content blended with poly(3-hydroxybutyrate-co-4-hydroxybutyrate) with a 20-50% 4-hydroxybutyrate content;

a poly(3-hydroxybutyrate-co-4-hydroxybutyrate) with 5% to 15% 4-hydroxybutyrate content blended with poly(3-hydroxybutyrate-co-5-hydroxyvalerate) with a 20% to 50% 5-hydroxyvalerate content;

a poly(3-hydroxybutyrate-co-4-hydroxybutyrate) with 5% to 15% 4-hydroxybutyrate content blended with a poly(3-hydroxybutyrate-co-3-hydroxyhexanoate) having a 5%-50% 3-hydroxyhexanoate content;

a poly(3-hydroxybutyrate-co-3-hydroxyvalerate) with 5% to 22% 3-hydroxyvalerate content blended with poly(3-hydroxybutyrate-co-4-hydroxybutyrate) with a 20-50% 4-hydroxybutyrate content;

a poly(3-hydroxybutyrate-co-3-hydroxyvalerate) with 5% to 22% 3-hydroxyvalerate content blended with a poly(3-hydroxybutyrate-co-5-hydroxyvalerate) with a 20% to 50% 5-hydroxyvalerate content;

a poly(3-hydroxybutyrate-co-3-hydroxyvalerate) with 5% to 22% 3-hydroxyvalerate content blended with a poly(3-hydroxybutyrate-co-3-hydroxyhexanoate) having a 5%-50% 3-hydroxyhexanoate content;

a poly(3-hydroxybutyrate-co-3-hydroxyhexanoate) with 3% to 15% 3-hydroxyhexanoate content blended with a poly(3-hydroxybutyrate-co-4-hydroxybutyrate) with a 20-50% 4-hydroxybutyrate content; a poly(3-hydroxybutyrate-co-3-hydroxyhexanoate) with 3% to 15% 3-hydroxyhexanoate content blended with a poly(3-hydroxybutyrate-co-5-hydroxyvalerate) with a 20% to 50% 5-hydroxyvalerate;

a poly(3-hydroxybutyrate-co-3-hydroxyhexanoate) with 3% to 15% 3-hydroxyhexanoate content blended with a poly(3-hydroxybutyrate-co-3-hydroxyhexanoate) having a 5%-50% 3-hydroxyhexanoate content;

a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b);

a polymer blend of a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b);

a polymer blend of a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b);

a polymer blend of a) a poly(3-hydroxybutyrate-co-4-hydroxybutyrate) with 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b);

a polymer blend of a) a poly(3-hydroxybutyrate-co-4-hydroxybutyrate) with 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b);

a polymer blend of a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b);

a polymer blend of a) a poly(3-hydroxybutyrate-co-3-hydroxyvalerate) with 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b);

a polymer blend of a) a poly(3-hydroxybutyrate-co-3-hydroxyvalerate) with 5% to 22% 3-hydroxyvalerate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b);

a polymer blend of a) a poly(3-hydroxybutyrate-co-3-hydroxyvalerate) with 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b);

a polymer blend of a) a poly(3-hydroxybutyrate-co-3-hydroxyhexanoate) with 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b);

a polymer blend of a) a poly(3-hydroxybutyrate-co-3-hydroxyhexanoate) with 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or a) a poly(3-hydroxybutyrate-co-3-hydroxyhexanoate) with 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b).

9. The composition of claim 8, wherein the weight of polymer a) is 20% to 60% of the combined weight of polymer a) and polymer b) and the weight of polymer b is 40% to 80% of the combined weight of polymer a) and polymer b).

10. The composition of claim 8, wherein the polymer is further blended with polymer c) a poly(3-hydroxybutyrate-co-4-hydroxybutyrate) 20% to 50% 4-hydroxybutyrate content.

11. The composition of claim 8, wherein the polymer is further blended with c) a poly(3-hydroxybutyrate-co-5-hydroxyvalerate) 20% to 50% 5-hydroxyvalerate content.

12. The composition of claim 8, wherein the polymer is further blended with c) a poly(3-hydroxybutyrate-co-3-hydroxyhexanoate) with 5% to 50% 3-hydroxyhexanoate content.

13. The composition of claim 10, wherein the weight of polymer c) is 5% to 95% of the combined polymer weight of polymer a), polymer b) and polymer c).

14. The composition of claim 10, wherein the weight of polymer c) is 5% to 40% of the combined polymer weight of polymer a), polymer b) and polymer c).

15. The composition of claim 8, wherein the polymer is further blended with c) selected from the group, a poly(3-hydroxybutyrate-co-4-hydroxybutyrate) 20% to 50% 4-hydroxybutyrate content, a poly(3-hydroxybutyrate-co-5-hydroxyvalerate) 20% to 50% 5-hydroxyvalerate content and a poly(3-hydroxybutyrate-co-3-hydroxyhexanoate) with 5% to 50% 3-hydroxyhexanoate content.

16. The composition of claim 15, wherein the weight of polymer c) is 5% to 95% of the combined polymer weight of polymer a), polymer b) and polymer c).

17. The composition of claim 11, wherein the weight of polymer c) is 5% to 95% of the combined polymer weight of polymer a), polymer b) and polymer c).

18. The composition of claim 12, wherein the weight of polymer c) is 5% to 95% of the combined polymer weight of polymer a), polymer b) and polymer c).

19. The composition of claim 15, wherein the weight of polymer c) is 5% to 40% of the combined polymer weight of polymer a), polymer b) and polymer c).

20. A polymer composition, comprising: a polymer and the composition of claim 5, wherein in the polymer is a) poly(3-hydroxybutyrate) homopolymer blended with a poly(3-hydroxybutyrate-co-4-hydroxybutyrate) with a 20-50% 4-hydroxybutyrate content;
   a poly(3-hydroxybutyrate) homopolymer blended with a poly(3-hydroxybutyrate-co-5-hydroxyvalerate) with a 20% to 50% 5-hydroxyvalerate content;
   a poly(3-hydroxybutyrate) homopolymer blended with a poly(3-hydroxybutyrate-co-3-hydroxyhexanoate) having a 5%-50% 3-hydroxyhexanoate content;
   a poly(3-hydroxybutyrate-co-4-hydroxybutyrate) with 5% to 15% 4-hydroxybutyrate content blended with poly(3-hydroxybutyrate-co-4-hydroxybutyrate) with a 20-50% 4-hydroxybutyrate content;
   a poly(3-hydroxybutyrate-co-4-hydroxybutyrate) with 5% to 15% 4-hydroxybutyrate content blended with poly(3-hydroxybutyrate-co-5-hydroxyvalerate) with a 20% to 50% 5-hydroxyvalerate content;
   a poly(3-hydroxybutyrate-co-4-hydroxybutyrate) with 5% to 15% 4-hydroxybutyrate content blended with a poly(3-hydroxybutyrate-co-3-hydroxyhexanoate) having a 5%-50% 3-hydroxyhexanoate content;
   a poly(3-hydroxybutyrate-co-3-hydroxyvalerate) with 5% to 22% 3-hydroxyvalerate content blended with poly(3-hydroxybutyrate-co-4-hydroxybutyrate) with a 20-50% 4-hydroxybutyrate content;
   a poly(3-hydroxybutyrate-co-3-hydroxyvalerate) with 5% to 22% 3-hydroxyvalerate content blended with a poly(3-hydroxybutyrate-co-5-hydroxyvalerate) with a 20% to 50% 5-hydroxyvalerate content;
   a poly(3-hydroxybutyrate-co-3-hydroxyvalerate) with 5% to 22% 3-hydroxyvalerate content blended with a poly(3-hydroxybutyrate-co-3-hydroxyhexanoate) having a 5%-50% 3-hydroxyhexanoate content;
   a poly(3-hydroxybutyrate-co-3-hydroxyhexanoate) with 3% to 15% 3-hydroxyhexanoate content blended with a poly(3-hydroxybutyrate-co-4-hydroxybutyrate) with a 20-50% 4-hydroxybutyrate content; a poly(3-hydroxybutyrate-co-3-hydroxyhexanoate) with 3% to 15% 3-hydroxyhexanoate content blended with a poly(3-hydroxybutyrate-co-5-hydroxyvalerate) with a 20% to 50% 5-hydroxyvalerate;
   a poly(3-hydroxybutyrate-co-3-hydroxyhexanoate) with 3% to 15% 3-hydroxyhexanoate content blended with a poly(3-hydroxybutyrate-co-3-hydroxyhexanoate) having a 5%-50% 3-hydroxyhexanoate content;
   a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b);
   a polymer blend of a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b);
   a polymer blend of a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b);
   a polymer blend of a) a poly(3-hydroxybutyrate-co-4-hydroxybutyrate) with 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b);
   a polymer blend of a) a poly(3-hydroxybutyrate-co-4-hydroxybutyrate) with 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b);
   a polymer blend of a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b);
   a polymer blend of a) a poly(3-hydroxybutyrate-co-3-hydroxyvalerate) with 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b);
   a polymer blend of a) a poly(3-hydroxybutyrate-co-3-hydroxyvalerate) with 5% to 22% 3-hydroxyvalerate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b);
   a polymer blend of a) a poly(3-hydroxybutyrate-co-3-hydroxyvalerate) with 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b);
   a polymer blend of a) a poly(3-hydroxybutyrate-co-3-hydroxyhexanoate) with 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b);
   a polymer blend of a) a poly(3-hydroxybutyrate-co-3-hydroxyhexanoate) with 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or
a) a poly(3-hydroxybutyrate-co-3-hydroxyhexanoate) with 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b).

21. The composition of claim 20, wherein the weight of polymer a) is 20% to 60% of the combined weight of polymer a) and polymer b) and the weight of polymer b is 40% to 80% of the combined weight of polymer a) and polymer b).

22. The composition of claim 20, wherein the polymer is further blended with polymer c) a poly(3-hydroxybutyrate-co-4-hydroxybutyrate) 20% to 50% 4-hydroxybutyrate content.

23. The composition of claim 20, wherein the polymer is further blended with c) a poly(3-hydroxybutyrate-co-5-hydroxyvalerate) 20% to 50% 5-hydroxyvalerate content.

24. The composition of claim 20, wherein the polymer is further blended with c) a poly(3-hydroxybutyrate-co-3-hydroxyhexanoate) with 5% to 50% 3-hydroxyhexanoate content.

25. The composition of claim 22, wherein the weight of polymer c) is 5% to 95% of the combined polymer weight of polymer a), polymer b) and polymer c).

26. The composition of claim 22, wherein the weight of polymer c) is 5% to 40% of the combined polymer weight of polymer a), polymer b) and polymer c).

27. The composition of claim 20, wherein the polymer is further blended with c) selected from the group, a poly(3-hydroxybutyrate-co-4-hydroxybutyrate) 20% to 50% 4-hydroxybutyrate content, a poly(3-hydroxybutyrate-co-5-hydroxyvalerate) 20% to 50% 5-hydroxyvalerate content and a poly(3-hydroxybutyrate-co-3-hydroxyhexanoate) with 5% to 50% 3-hydroxyhexanoate content.

28. The composition of claim 27, wherein the weight of polymer c) is 5% to 95% of the combined polymer weight of polymer a), polymer b) and polymer c).

29. The composition of claim 23, wherein the weight of polymer c) is 5% to 95% of the combined polymer weight of polymer a), polymer b) and polymer c).

30. The composition of claim 24, wherein the weight of polymer c) is 5% to 95% of the combined polymer weight of polymer a), polymer b) and polymer c).

31. The composition of claim 27, wherein the weight of polymer c) is 5% to 40% of the combined polymer weight of polymer a), polymer b) and polymer c).

* * * * *

UNITED STATES PATENT AND TRADEMARK OFFICE
CERTIFICATE OF CORRECTION

PATENT NO. : 8,487,023 B2
APPLICATION NO. : 12/988175
DATED : July 16, 2013
INVENTOR(S) : Robert S. Whitehouse and Allen R. Padwa It is certified that error appears in the above-identified patent and that said Letters Patent is hereby corrected as shown below:

In the Claims

In Column 24, Claim 5, line 39, delete "Span 80 sorbitan monoleate" and insert
--SPAN™ 80 sorbitan monooleate--

Signed and Sealed this
Twelfth Day of November, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,487,023 B2 | Page 1 of 1 |
| APPLICATION NO. | : 12/988175 | |
| DATED | : July 16, 2013 | |
| INVENTOR(S) | : Whitehouse et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this
Twenty-sixth Day of May, 2015

Michelle K. Lee
*Director of the United States Patent and Trademark Office*